United States Patent
Choi

(10) Patent No.: US 10,513,665 B2
(45) Date of Patent: Dec. 24, 2019

(54) VANADIUM CORROSION INHIBITORS IN GAS TURBINE APPLICATIONS

(71) Applicant: Saudi Arabian Oil Company, Dhahran (SA)

(72) Inventor: Ki-Hyouk Choi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/987,532

(22) Filed: May 23, 2018

(65) Prior Publication Data
US 2018/0265797 A1 Sep. 20, 2018

Related U.S. Application Data

(62) Division of application No. 15/482,218, filed on Apr. 7, 2017.
(Continued)

(51) Int. Cl.
*C10L 10/04* (2006.01)
*C08K 3/22* (2006.01)
(Continued)

(52) U.S. Cl.
CPC ............... *C10L 10/04* (2013.01); *B82Y 30/00* (2013.01); *C08K 3/04* (2013.01); *C08K 3/22* (2013.01); *C09C 1/565* (2013.01); *C10L 1/12* (2013.01); *C10L 1/1208* (2013.01); *C10L 1/1233* (2013.01); *C10L 1/322* (2013.01); *C23F 11/187* (2013.01); *F02C 3/30* (2013.01); *F02C 7/30* (2013.01); *C01P 2002/72* (2013.01); *C01P 2002/88* (2013.01); *C01P 2004/64* (2013.01); *C01P 2006/12* (2013.01);
(Continued)

(58) Field of Classification Search
CPC .................................. C10L 10/04; C08K 3/22
See application file for complete search history.

(56) References Cited

U.S. PATENT DOCUMENTS 2,062,159 A 11/1936 Brizzolara et al.
2,439,442 A 4/1948 Amon et al.
(Continued)

FOREIGN PATENT DOCUMENTS

CN 1916133 A 2/2007
EP 0460959 A2 12/1991
(Continued)

OTHER PUBLICATIONS

Machine Translation of JP2004188243A (Year: 2004).*
(Continued)

*Primary Examiner* — James C Goloboy
*Assistant Examiner* — Ming Cheung Po
(74) *Attorney, Agent, or Firm* — Dinsmore & Shohl

(57) ABSTRACT

The present embodiments describe a method to reduce vanadium corrosion in a gas turbine by adding an oleophilic corrosion inhibitor into a combustion fuel, in which the oleophilic corrosion inhibitor comprises carbon black support particles and magnesium bonded to the carbon black support particles. The carbon black support particles comprise a particle size less than 40 nanometer (nm), and oxygen content less than 1 weight percent (wt %), and a surface area of at least 50 square meters per gram ($m^2$/gram).

13 Claims, 2 Drawing Sheets

Related U.S. Application Data

(60) Provisional application No. 62/324,387, filed on Apr. 19, 2016.

(51) Int. Cl.

| | | |
|---|---|---|
| *C10L 1/32* | (2006.01) | |
| *C23F 11/18* | (2006.01) | |
| *B82Y 30/00* | (2011.01) | |
| *C09C 1/56* | (2006.01) | |
| *C10L 1/12* | (2006.01) | |
| *F02C 7/30* | (2006.01) | |
| *F02C 3/30* | (2006.01) | |
| *C08K 3/04* | (2006.01) | |

(52) U.S. Cl.
CPC .............. *C08K 2003/222* (2013.01); *C10L 2200/0213* (2013.01); *C10L 2200/0438* (2013.01); *C10L 2230/08* (2013.01); *C10L 2250/06* (2013.01); *C10L 2270/04* (2013.01); *C10L 2290/24* (2013.01); *F05D 2260/95* (2013.01)

(56) References Cited

U.S. PATENT DOCUMENTS

| | | | | |
|---|---|---|---|---|
| 2,781,005 | A | * | 2/1957 | Tristram .............. C10L 1/10 431/4 |
| 2,823,235 | A | | 2/1958 | Penrose et al. |
| 2,938,779 | A | | 5/1960 | Kolfenbach et al. |
| 3,692,503 | A | * | 9/1972 | Kukin .............. C10L 1/14 44/354 |
| 4,163,728 | A | | 8/1979 | Chen et al. |
| 4,263,207 | A | | 4/1981 | Rokach et al. |
| 4,597,433 | A | | 7/1986 | Johnson |
| 5,803,947 | A | | 9/1998 | Engell et al. |
| RE36,117 | E | | 3/1999 | Bornstein et al. |
| 5,951,849 | A | | 9/1999 | Miller et al. |
| 6,488,753 | B1 | | 12/2002 | Ito et al. |
| 6,632,257 | B1 | | 10/2003 | Feitelberg et al. |
| 7,037,262 | B2 | | 5/2006 | Aston et al. |
| 7,951,758 | B2 | | 5/2011 | Sandu et al. |
| 8,282,693 | B2 | | 10/2012 | Moliere et al. |
| 8,580,716 | B2 | | 11/2013 | Ma et al. |
| 8,680,319 | B2 | | 3/2014 | Kocak et al. |
| 2002/0137627 | A1 | | 9/2002 | Kayama et al. |
| 2006/0059768 | A1 | | 3/2006 | Wallenbeck et al. |
| 2008/0292894 | A1 | | 11/2008 | Park et al. |
| 2010/0199546 | A1 | | 8/2010 | Gilmurray |
| 2010/0249460 | A1 | * | 9/2010 | Ostgard .............. B01J 21/18 564/423 |
| 2014/0315136 | A1 | | 10/2014 | Moliere |

FOREIGN PATENT DOCUMENTS

| | | | | |
|---|---|---|---|---|
| EP | 0792951 | A1 | 11/1995 | |
| EP | 2684923 | A | 1/2014 | |
| GB | 921621 | A | 3/1963 | |
| JP | 2004188243 | A | * 7/2004 | .......... B01D 53/864 |
| JP | 2004188243 | A | 7/2004 | |
| WO | 2004026996 | A1 | 4/2004 | |
| WO | 2006068438 | A1 | 6/2006 | |
| WO | 2012074496 | A1 | 6/2012 | |

OTHER PUBLICATIONS

International Search Report pertaining to International PCT Application No. PCT/US2017/026770 dated Sep. 4, 2017.

Written Opinion pertaining to International PCT Application No. PCT/US2017/026770 dated Sep. 4, 2017.

Invitation to Pay Additional Fees and Search Report pertaining to PCT Application No. PCT/US2017/026770 dated Jun. 30, 2017.

Isahak et al., "Magnesium Oxide Nanoparticles on Green Activated Carbon as Efficient Co2 Adsorbent", the 2013 UKM FST Postgraduate Colloquium, AIP Conference Proc. 1571, pp. 882-889, Malaysia.

Przepiorski et al., "Preparation and properties of porous carbon material containing magnesium oxide", Polish Journal of Chemical Technology, vol. 13, No. 4, pp. 42-46, Poland.

Office Action pertaining to U.S. Appl. No. 15/987,535 dated Oct. 10, 2018.

Office Action pertaining to U.S. Appl. No. 15/482,218 dated Sep. 21, 2018.

Office Action dated Feb. 26, 2019 pertaining to U.S. Appl. No. 15/987,535, filed May 23, 2018, 14 pgs.

U.S. Office Action dated Apr. 5, 2019 pertaining to U.S. Appl. No. 15/482,218, filed Apr. 7, 2017, 17 pgs.

U.S. Office Action dated Jul. 1, 2019 pertaining to U.S. Appl. No. 15/482,218, filed Apr. 7, 2017, 18 pgs.

Kus, Slawomir & Otremba, Marian & T6rz, Artur & Taniewski, Marian. (2002). The effect of gas atmosphere used in the calcination of MgO on its basicity and catalytic performance in oxidative coupling of methane. Applied Catalysis A: General. 230. 263-270 ( Year: 2002) Guwahati (https://web.archive.org/web/201511113051328/https://nptel.ac.in/courses/103103026/10) (Year: 2015).

Guwahati (https://web.archive.org/web/20151118051328/https://nptel.ac.in/courses/103103026/10) (Year 2015).

Office Action dated Aug. 9, 2019 pertaining to U.S. Appl. No. 15/987,535, filed May 23, 2018, 24 pgs.

\* cited by examiner

VANADIUM CORROSION INHIBITORS IN GAS TURBINE APPLICATIONS

CROSS-REFERENCE TO RELATED APPLICATIONS

This application is a divisional application of U.S. patent application Ser. No. 15/482,218 filed Apr. 7, 2017, which claims priority to U.S. Provisional Patent Application Ser. No. 62/324,387 filed Apr. 19, 2016, which is incorporated by reference herein in its entirety.

TECHNICAL FIELD

Embodiments of the present disclosure generally relate to combustion fuel additives, specifically vanadium corrosion inhibitors in gas turbines.

BACKGROUND

One of the most popular methods to generate energy is hydrocarbon combustion, which includes natural gas, petroleum gas, coal and liquid hydrocarbons, such as petroleum crude oil. Combustion generates heat, steam, electricity, and other types of energy. Gas turbines, an internal combustion engine, have been a representative machine to use hydrocarbons for generating energy. A gas turbine has two main components, a combustion chamber and a rotating turbine. Energy is generated from hydrocarbon combustion, and the efficiency is strongly dependent on the firing temperature—the greater the temperature the more efficient. Current gas turbines can reach temperature of 1430° C.

Liquid fuel is a common hydrocarbon used in various machines, and diesel has been a common liquid fuel due to its low viscosity and cleanness. Due to increasing demand, heavy oil is a more acceptable alternative to diesel. In spite of its wide availability and low economic value, heavy oil has many drawbacks. Using heavy oil generates soot and other incomplete combustion particles, air pollutants, and other pollutants, such as $SO_x$ and $NO_x$, during combustion and affects the air quality. Heavy oil also contains metallic compounds. In most cases, those metals are vanadium, nickel, iron, alkali, and alkaline earth metal-containing compounds. The metal-containing compounds found in the heavy oil can cause corrosion in the gas turbine during the combustion process. Vanadium compounds can severely corrode the metallic and protective layers when exposed to elevated temperatures in the gas turbine. Vanadium compounds, which are present as organometallic compounds in heavy oil, are converted to vanadium oxide ($V_2O_5$) during combustion. Vanadium oxide has a low melting point of 675° C., which means vanadium oxide melts at much lesser temperatures than the firing temperatures of gas turbines. Melted vanadium oxide adheres to the hot surface in gas turbine and reacts with metallic and protective layers to cause corrosion.

SUMMARY

Adding additives to the heavy oil limits the corrosion caused by vanadium oxide, and magnesium compounds are effective additives. Magnesium oxide (MgO) reacts with vanadium oxide to form magnesium-vanadium mixed oxide compound, which has a much greater melting points than vanadium oxide ($V_2O_5$). The magnesium-vanadium mixed oxides are present as ash and do not adhere to the metallic and protective layer of the gas turbine, thereby limiting the amount of corrosion caused by vanadium oxide. A magnesium oxide slurry may be injected into gas turbines, but a serious drawback is that solid state reactions, which lead to the formation of refractory magnesium-vanadium mixed oxides, are extremely slow even at elevated temperatures.

Embodiments of this disclosure describe methods to reduce vanadium corrosion in a gas turbine by introducing an oleophilic corrosion inhibitor into a combustion fuel, in which the oleophilic corrosion inhibitor comprises carbon black support particles and magnesium attached to the carbon black support particles. The carbon black support particles comprise a particle size less than 40 nanometer (nm), and oxygen content less than 1 weight percent (wt %), and a surface area of at least 50 square meters per gram ($m^2$/gram).

According to some embodiments, methods of making the vanadium corrosion inhibitor comprises oxidizing carbon black particles, mixing the oxidized carbon black with a magnesium salt solution, drying the mixture to yield a dried mixture of oxidized carbon black and magnesium salt, and then calcining the dried mixture to produce the vanadium corrosion inhibitor. The vanadium corrosion inhibitor comprises magnesium oxide bonded to the carbon black support particles. The carbon black support particles comprise a particles size less than 40 nm, an oxygen content less than 1.0 weight percent, an ash content less than 0.5 weight percent, and a surface area greater than 50 $m^2$/gram.

The methods of making the vanadium corrosion inhibitor in the preceding paragraph yield an oleophilic corrosion inhibitor. The oleophilic corrosion inhibitor comprises oleophilic carbon black support particles and magnesium attached to the carbon support particles. The carbon black support particles comprise a particle size less than 40 nm, an oxygen content less than 1.0 weight percent, an ash content less than 0.5 weight percent, and a surface area of at least 50 $m^2$/gram. The magnesium includes magnesium oxide, elemental magnesium, or combinations thereof, in which the magnesium content of the oleophilic corrosion inhibitor includes at least 0.05 to 20 weight percent magnesium oxide.

Additional features and advantages of the described embodiments will be set forth in the detailed description which follows, and in part will be readily apparent to those skilled in the art from that description or recognized by practicing the described embodiments, including the detailed description which follows, the claims, and the figures.

DETAILED DESCRIPTION

Figure 1:
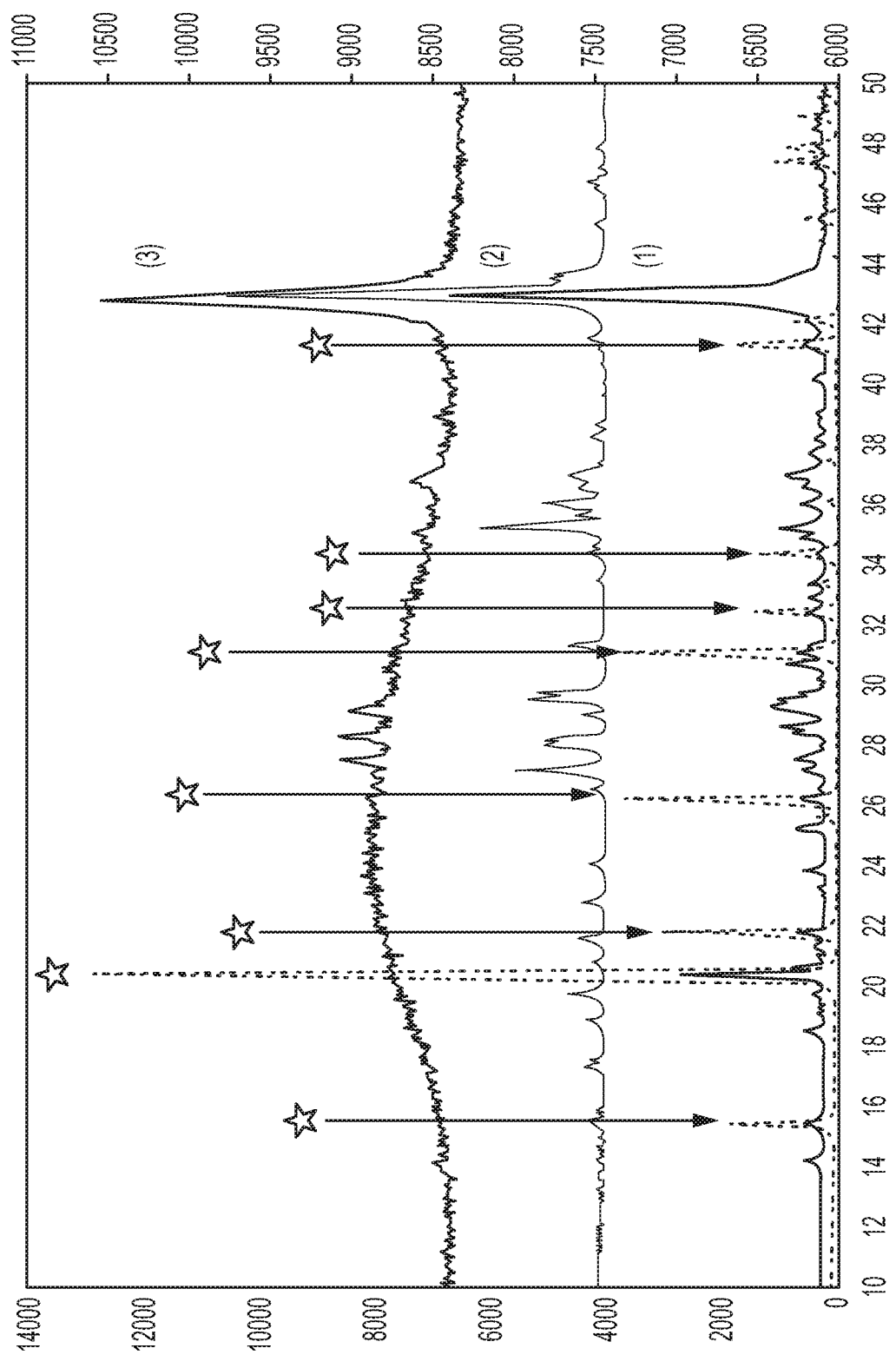
FIG. 1 includes stacked X-Ray Diffraction spectra of three samples, in which sample 1 "(1)" and sample 2 "(2)" do not contain magnesium loaded carbon black. Sample 3 "(3)" contains magnesium oxide on a carbon black support. The dotted line is the x-ray diffraction of vanadium oxide ($V_2O_5$).

Methods for reducing vanadium corrosion in a gas turbine comprise adding an oleophilic corrosion inhibitor into a combustion fuel, in which the oleophilic corrosion inhibitor includes carbon black support particles and magnesium attached to the carbon black support particles. The carbon black support particles include a particles size less than 40 nm, oxygen content less than 1.0% by weight, and a surface area of at least 50 m²/gram.

As used in this disclosure, the term "support" or "supporting" in reference to "support particles" means weak physical interactions or chemical binding between the support particle (for example, carbon black) and the supported material (such as magnesium). For example, when there are strong chemical binding between the support particle and the supported material, surface groups, such as silica hydroxide (Si—OH), react with metal compounds to form strong chemical bonds such as Si—O—Mg. As for carbon black, such strong chemical bindings are not expected.

The carbon black support particles may be oleophilic and thus are able to disperse, dissolve, or otherwise become a solution when mixed with liquid fuel. An oleophilic corrosion inhibitor includes carbon black support and magnesium. The oleophilic corrosion inhibitor may disperse in the oil, and more easily reacts with the vanadium than the corrosion inhibitors based on oleophobic magnesium compounds, which are generally dissolved in water before injecting the aqueous solution into the combustion field.

Carbon black is a type of elemental carbon in the form of colloidal particles that are produced by incomplete combustion or thermal decomposition of gaseous or liquid hydrocarbons under controlled conditions. The physical appearance of carbon black appears black and is finely divided pellet or powder. In accordance with one or more embodiments, the primary particle size, which may be defined as "mean particle size" in accordance with ASTM D 3849, should be less than 40 nm in diameter or less than 20 nm as measured by electron microscope. The oxygen content of the carbon black support particles may be less than 1.0 weight percent and in some embodiments, less than 0.5 weight percent.

In one or more embodiments, carbon black includes acetylene black, channel black, furnace black, lamp black, and thermal black. In some embodiments, carbon black may be acetylene black. Acetylene black may have a small ash content or a small amount of impurities. The ash content of the carbon black support particles correlates to the effectiveness of the carbon black, and may be less than 0.5 weight percent. In one or more embodiments, the ash content of the carbon black support particles is less than 0.2 weight percent, and in some embodiments the ash content is less than 0.1 weight percent. "Ash content" in reference to carbon black means any inorganic impurity, which is not combusted and remains after burning at 750° C. in air.

In one or more embodiments, magnesium is attached to the carbon black support. The term "attached" may refer to a chemical bond, a physical interaction, or otherwise connected to. The greater the surface area of the carbon black support, the more magnesium can attach to the support, and thereby reacting with more of the corrosive material. One embodiment of the carbon black support particles has a surface area from 50 m²/grams to 100 m²/grams. In another embodiment the surface area is from 75 m²/grams to 100 m²/grams.

The magnesium of the oleophilic corrosion inhibitor may be elemental magnesium, magnesium oxide, or a combination of both elemental magnesium and magnesium oxide. In some embodiments, the magnesium of the oleophilic corrosion inhibitor includes at least 0.05 to 25.0 weight percent magnesium oxide based on the weight of the oleophilic corrosion inhibitor. In other embodiments, the amount of magnesium is from 0.05 and 20.0 weight percent or 0.1 weight percent to 10.0 weight percent magnesium oxide based on the weight of the oleophilic corrosion inhibitor. In some embodiments, the magnesium oxide is between 0.5 and 5.0 weight percent.

The oleophilic corrosion inhibitor is added into a combustion fuel. The combustion fuel may include liquid oil. Liquid oil is any hydrocarbon that can be combusted in gas turbines without causing problems such as corrosion and plugging. Liquid oil may include crude oil or diesel. The combustion fuel can be selected from diesel, gasoline or any other hydrocarbon fuel having a flash point greater than 35° C. Unlike the magnesium oxide used in prior art, this oleophilic corrosion inhibitor decreases the formation of vanadium oxide during combustion, and thereby decreases gas turbine corrosion.

The oleophilic vanadium corrosion inhibitor is synthesized by oxidizing carbon black particles, then mixing the oxidized carbon black with a magnesium salt containing solution or a magnesium oxide aqueous solution. The carbon black and magnesium solution is mixed vigorously by an agitator, an ultrasonic mixer, or a homogenizer. After a certain time, the mixture is filtered. The filtrate is dried. The dried mixture is then calcined by heating under flowing inert gas to produce the oleophilic corrosion inhibitor.

As stated in a preceding paragraph, carbon black is oleophilic. Since acetylene black is oleophilic and not hydrophilic, the reactivity between non-treated acetylene black and an aqueous magnesium salt solution is limited. The carbon black should be pretreated with an oxidizing agent before magnesium can attach to the carbon support. An oxidizing agent increases the amount of oxygen on the particles surface, which increases the polarity and allows the carbon material to be more hydrophilic. Non-limiting examples of oxidizing agents include nitric acid; inorganic peroxides such as hydrogen peroxide; sulfuric acid, peroxydisulfuric acid, peroxymonosulfuric acid; halogen compounds such as chlorite, chlorate, perchlorate; hypochlorite; hexavalent chromium compounds such as chromic and dichromic acids and chromium trioxide; permanganate compounds; sodium perborate; and nitrous oxide.

After the carbon support has been pretreated with an oxidizing agent in solution, it is dried under the flow of inert gas, such as argon, helium, or nitrogen, at temperature of from 200° and 400° C. or 250° C. and 300° C. The term "solution" is non-limiting and can include polar, aqueous, polar non-aqueous, and non-polar solvents. In one embodiment, an aqueous solutions is utilized due to the ease of drying the pretreated carbon.

Oxidizing the carbon support material creates a sufficient affinity to a magnesium precursor. One method of oxidizing the carbon black support is with an oxidizing agent or immersing the particles in an oxidizing solution, as mentioned in a preceding paragraph, but the carbon black particles can be oxidized by heating the particles in an oxidizing atmosphere. The oxidizing atmosphere can comprise oxygen and argon gas or oxygen and helium gas, but is not limited to those two examples. Sufficient temperatures, when heating the carbon in the oxidizing atmosphere, would be of from 120° C. to 800° C. The temperature is determined by measuring the weight loss under heating. The selected temperature should give a 0.1 wt % to 10 wt % loss by oxidation of the carbon black. The optimum temperature can be selected by using Thermo Gravimetric Analysis (TGA). Though 0.1 wt % loss is a relatively small decrease in weight percent, in FIG. 2, the TGA graph shows that carbon black gains weight from chemical adsorption of oxygen up to approximately 600° C. Such weight gain is from chemical, not physical, adsorption of oxygen, which does not occur when carbon black is loaded with magnesium oxide.

The corrosion inhibitor may be prepared or pretreated with non-oxidizing chemicals, such as the anion of a magnesium salt precursor, for example, nitrate ion ($NO_3^-$) of magnesium nitrate. A nitrate ion may function as an oxidizing reagent. In some embodiments, oxidation of the carbon black surface and the subsequent attachment of magnesium compounds onto the oxidized surface occur in the same solution.

The sequence or method of oxidation and addition of magnesium may vary. One example, mentioned in the preceding paragraph the oxidation of the carbon black and attachment of the magnesium onto the carbon black occurs in one step. Another example involves: first, pretreating the carbon black (meaning oxidizing and drying), and then mixing the pretreated carbon black in a magnesium salt solution or with a magnesium precursor. The magnesium salt solution may be made by dissolving a magnesium salt such as magnesium chloride, magnesium nitrate, magnesium sulfate, or another magnesium salt in a suitable polar solvent, such as water. The magnesium salt solution is mixed with the pretreated carbon support. After a time, the solution is filtered and the filtrate is dried by heating under flowing inert gas such as argon, nitrogen or helium. The drying temperature is between 90° C. and 200° C., more specifically between 110° C. and 150° C. After it is dried, the compound is calcined.

Calcination converts the magnesium precursor to magnesium oxide and removes surface oxygen not consumed by bonding with magnesium. However, some oxygen groups may remain, because magnesium ions and magnesium can interact with the oxygen groups due to the polarity of each group. To insure the oleophilic nature of the carbon black/magnesium oxide complex, the carbon black/magnesium oxide complex is heated under inert gas, which removes the excess oxygen in the form of carbon dioxide ($CO_2$) or carbon monoxide (CO), and thus forming the oleophilic corrosion inhibitor.

The oleophilic corrosion inhibitor is calcined by heating to temperatures greater than the decomposition temperature, approximately 350° C. The calcination temperature is selected to yield at least 20 weight percent of magnesium oxide from loaded magnesium, and in some embodiments there is approximately 100% by weight of magnesium oxide from the loaded magnesium. A very high temperature is required to convert 100% of the loaded magnesium to magnesium oxide, for example, temperatures between 200° C. and 900° C., or even between 300° C. and 500° C., though in some embodiments the temperature is between 500° C. and 900° C.

The process mentioned in the preceding paragraphs describes a process to adhere magnesium oxide to a carbon support, which creates an oleophilic corrosion inhibitor. Once the corrosion inhibitor is synthesized, the oleophilic corrosion inhibitor is added to the liquid fuel solvents or other combustible fuels. The oleophilic magnesium additive can be mixed by agitator, homogenizer, ultrasonic mixer, static mixer (such as mixing tee) or anything known in the art. The amount of the oleophilic corrosion inhibitor is added to the combustion fuel in excess of the vanadium. The amount in excess can be from 2 to 1 by weight of MgO to $V_2O_5$ or 3 to 1 by weight of MgO to $V_2O_5$, and as much as 5 to 1 by weight of MgO to $V_2O_5$.

EXAMPLES

In order that the embodiments may be more easily understood, reference is made to the following examples which are intended to illustrate embodiments disclosed and described in the application. The examples are in no ways limiting in scope.

The carbon black was pretreated with the following procedure: Acetylene black, obtained from Denka and had a particle size of 35 nm, a surface area of 68 $m^2$/gram, and an ash content of 0.01 weight percent, was soaked in nitric acid (2 normal (N)) at room temperature for 24 hours. Then the carbon black was filtered and dried at 250° C. with flowing nitrogen gas ($N_2$). The dried carbon black was added to deionized water (having a conductivity less than 0.056 microsiemens per centimeter (µS/cm); type I water by ASTM definition) and refluxed for at least 6 hours before the magnesium compounds were added. The weight ratio of dried carbon to water was 1 to 2. The carbon and water mixture, called carbon black slurry (CBS), contained 98 grams of dried carbon black and 196 grams of deionized water.

The magnesium precursor was prepared by dissolving magnesium nitrate hexahydrate ($Mg(NO_3)_2.6H_2O$) in deionized water to have a 0.1 molar magnesium concentration in aqueous solution.

The magnesium precursor solution was added to the CBS. The amount of magnesium nitrate solution was adjusted such that upon oxidation the resultant solution would have 4 weight percent of magnesium oxide. Specifically, 1,000 milliliters (mL) of magnesium nitrate hexahydrate solution (0.1 mole of magnesium; 4.03 grams of MgO) was added to 294 grams of CBS (MgO/(Carbon black+MgO) yields 4 weight %. The CBS and magnesium solution were vigorously mixed and heated to 90° C. for slow evaporation of about 50 weight % of water. Then the mixture was cooled to room temperature. The mixture was filtered, and the filtered mixture was dried at 150° C. under flowing $N_2$ for at least 6 hours. The dried mixture was calcined at 450° C. for at least 6 hours under flowing $N_2$.

The stock solution was prepared by adding the calcined mixture to a ball mill with an alumina ball and pulverizing the mixture. The pulverized mixture was mixed with diesel having American Petroleum Institute (API) gravity of 40° and flash point of 55° C., by using a blade type agitator for 24 hours to form the stock solution. The ratio by weight of pulverized mixture to diesel was 1:99.

Dispersion of the magnesium and carbon black support was determined by taking several samples, for example 10 samples. As much as 1 gram of the stock solution was dissolved in toluene. After filtering the toluene solution, the filtrate was dried and weighed to determine the amount of carbon black loaded with magnesium in each sample. The difference of the weight of the filtrate from each sample varied by plus or minus 10% in the stock solution. Thus indicating oleophilic corrosion inhibitor was evenly dispersed.

Once the oleophilic corrosion inhibitor was synthesized, it was added to the combustion fuel. The stock solution was added to the liquid fuel, specifically the fuel was Arab Medium crude oil, which has an API Gravity of 31°, and a Vanadium content of 33 weight parts per million (ppm). The liquid fuel was prewashed with water to remove alkali and alkaline earth metals. The amount of stock solution to liquid fuel was prepared to give an excess of 3 to 1 by weight of MgO to $V_2O_5$.

The preparation addition of stock solution to the liquid fuel as described above greatly reduced the corrosive effect of vanadium.

FIG. 1 is an X-ray Diffraction spectrum showing the presences of vanadium oxide in one of the three samples.

Sample 1 and Sample 2 were prepared by combining vanadium oxide (0.3134 gram, powder, Sigma-Aldrich, <98%) and magnesium oxide (1.2114 gram, powder, Fisher-Scientific, A.C.S. Grade). The ratio of $MgO/V_2O_5$ was 3.8 wt/wt. The powders were mixed by mortar and pestle for 30 minutes, which produced a unified color. For Sample 1, the mixed powder was calcined at 650° C., and for Sample 2, the mixed powder was calcined at 750° C. Sample 3 was loaded carbon black, magnesium oxide on the carbon black support, combined with vanadium oxide. The sample was prepared by mixing 40 mL of purified water with carbon black (10.16 gram, acetylene black, 99.9+%, Alfa Aesar) and Magnesium nitrate hexahydrate (2.822 gram, $[Mg(NO_3)_2.6H_2O]$, Sigma-Aldrich, A.C.S. grade). In this example, the nitrate ion of the magnesium nitrate functioned as the oxidizing reagent. This combination created a paste, which was mixed for an hour. The paste was dried under air at 90° C. while mixing with a glass rod until no water was found, which was approximately 4 hours. The dried sample was placed in an oven at 105° C. for 24 hours in air to ensure dehydration of each sample. The dried sample was calcined at 350° C. for 6 hours under flowing $N_2$. The calcined sample (2.87 gram) was mixed with vanadium oxide (0.04 gram) by mortar and pestle for 30 minutes. The ratio of $MgO/V_2O_5$ was 3.1 wt/wt. The mixed sample was calcined at 650° C. for 2 hours in air. After the calcination process, all three samples were ground by mortar and pestle for 30 minutes, and then tested.

Referring to FIG. 1, this spectrum demonstrated that carbon black supported magnesium oxide (Sample 3) had better solid state reaction activity towards $V_2O_5$ than unsupported magnesium oxide additives (MV-PM-2-650). Such enhanced solid state reaction activity results from the excessive heat supply during local burning of carbon black. Elevated calcination temperatures increased the magnesium oxide and vanadium oxide solid state reactivity, as evidenced by missing $V_2O_5$ signals as indicated from the stars. This spectrum also demonstrated that carbon black supported magnesium could remove $V_2O_5$ signals at 650° C., while the $V_2O_5$ signal remained when tested with unsupported magnesium at 650° C.

Figure 2:
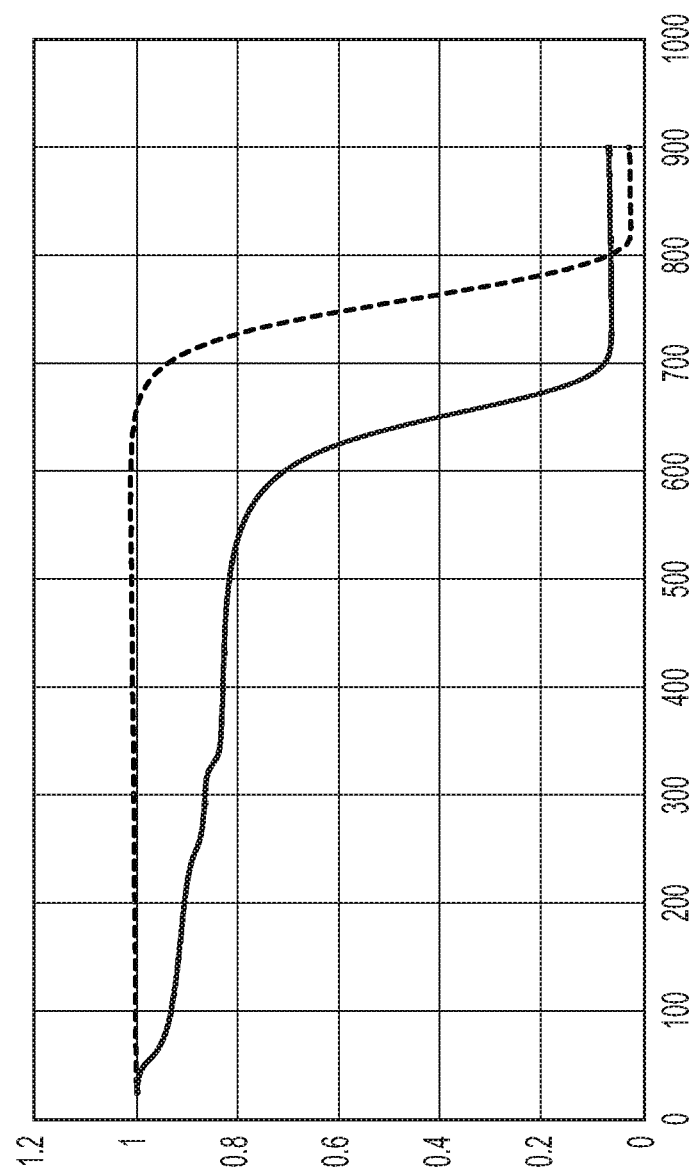
FIG. 2 is a graph of a thermogravimetric analysis showing the weight (normalized) of carbon black (dotted line) and magnesium oxide on carbon black support (solid line) as a function of temperature in degree Celsius.

The themogravimetric analysis (TGA), in FIG. 2, showed that magnesium loaded carbon black (solid line) had weight loss at much lesser temperature than carbon black. Without being bound by theory, it is believed that the weight loss is most likely due to the magnesium oxide on the carbon black reacting with the vanadium. Without such metals, carbon black is more difficult to combust at temperature lesser than 600 to 700° C. Metals, such as magnesium and vanadium, would increase the rate of carbon black combustion. Carbon black combustion most likely produced the extra heat at a localized area, which might help the formation of magnesium-vanadium mixed oxide. As the magnesium and vanadium formed a mixed metal oxide, the magnesium was no longer attached to the carbon black, thereby causing the carbon black to decrease in weight. In contrast, carbon black (represented by a dotted line), which requires a greater incendiary temperature, retained a constant weight at lesser temperatures. Additionally, the TGA data shows that carbon black was not a barrier for magnesium to react with vanadium at firing temperature (greater than 1000° C.) because it is combusted at lesser temperature.

Unless otherwise defined, all technical and scientific terms used have the same meaning as commonly understood by one of ordinary skill in the art to which the claimed subject matter belongs. The terminology used in this description is for describing particular embodiments only and is not intended to be limiting. As used in the specification and appended claims, the singular forms "a," "an," and "the" are intended to include the plural forms as well, unless the context clearly indicates otherwise.

It is noted that terms like "preferably," generally," and "typically" are not utilized to limit the scope of the appended claims or to imply that certain features are critical, essential, or even important to the function of the claimed subject matter. Rather, these terms are merely intended to highlight alternative or additional features that may or may not be utilized in a particular embodiment.

It is noted that the terms "substantially" and "about" may be utilized to represent the inherent degree of uncertainty that may be attribute to any quantitative comparison, value, measurement, or other representation. These terms are also utilized to represent the degree by which a quantitative representation may vary from a stated reference without resulting in a change in basic function of the subject matter at issue.

It will be apparent to those skilled in the art that various modifications and variations can be made to the embodiments described without departing from the spirit and scope of the claimed subject matter. Thus it is intended that the specification cover the modifications and variations of the various described embodiments provided such modification and variations come within the scope of the appended claims and their equivalents.

I claim:

1. A method of reducing vanadium corrosion in a gas turbine comprising:
    adding an oleophilic corrosion inhibitor into a combustion fuel, in which the oleophilic corrosion inhibitor comprises magnesium chemically bonded to carbon black support particles;
    allowing the combustion fuel to combust in the gas turbine; and
    reducing vanadium corrosion in the gas turbine.

2. The method of claim 1, further comprising mixing the oleophilic corrosion inhibitor and the combustion fuel.

3. The method of claim 1, further comprising mixing the oleophilic corrosion inhibitor with liquid fuel solvent.

4. The method of claim 1, in which:
    the magnesium comprises magnesium oxide; and
    the oleophilic corrosion inhibitor is added in an amount such that an amount of magnesium oxide is greater than an amount of vanadium in the gas turbine.

5. The method of claim 1, in which the combustion fuel comprises liquid oil.

6. The method of claim 1, in which the magnesium comprises at least one of magnesium oxide and elemental magnesium.

7. The method of claim 1, in which the magnesium comprises from 0.05 to 20 weight percent magnesium oxide.

8. The method of claim 1, in which the carbon black support particles comprise acetylene black.

9. The method of claim 1, in which the carbon black support particles comprise a particle size of less than 20 nm.

10. The method of claim 1, in which the carbon black support particles comprise an ash content of less than 0.5 weight percent.

11. The method of claim 1, in which the carbon black support particles comprise a surface area of from 50 $m^2$/gram to 100 $m^2$/gram.

12. The method of claim 1, in which the magnesium is attached to the carbon black support particles.

13. The method of claim 1, in which the carbon black support particles comprise:
 a particle size of less than 40 nm;
 an oxygen content of less than 1 weight percent; and
 a surface area of at least 50 $m^2$/gram.

* * * * *